Oct. 28, 1952     H. R. KARP ET AL     2,616,018

TEMPERATURE CONTROL SYSTEM

Filed June 17, 1949

INVENTORS
HARRY R. KARP
ALLEN W. BLANCHARD
BY
ATTORNEY

Patented Oct. 28, 1952

2,616,018

UNITED STATES PATENT OFFICE 2,616,018

TEMPERATURE CONTROL SYSTEM

Harry R. Karp, Newark, and Allen W. Blanchard, Allendale, N. J., assignors to Bendix Aviation Corporation, Teterboro, N. J., a corporation of Delaware Application June 17, 1949, Serial No. 99,764

6 Claims. (Cl. 219—20)

1

The present application relates to a novel windshield heater control, temperature sensing device.

An object of the invention is to provide a novel system for controlling the application of heat to the windshield of an aircraft to effect the removal and prevention of the accumulation of ice thereon.

Another object of the invention is to provide a novel system for controlling the application of heat to the windshield of an aircraft that will limit the rate of change of temperature to a safe value.

Another object of the invention is to provide a novel two-speed control for the application of heat to a windshield.

Another objection of the invention is to provide a windshield heater control in which a thermally sensitive bridge is used to control the power supplied to heating means embodied in the windshield, and in which the temperature sensing elements of the bridge circuit are embedded in the windshield.

The above and other objects and features of the invention will appear more fully hereinafter from a consideration of the following description taken in connection with the accompanying drawings wherein one embodiment of the invention is illustrated by way of example.

Figure 1:
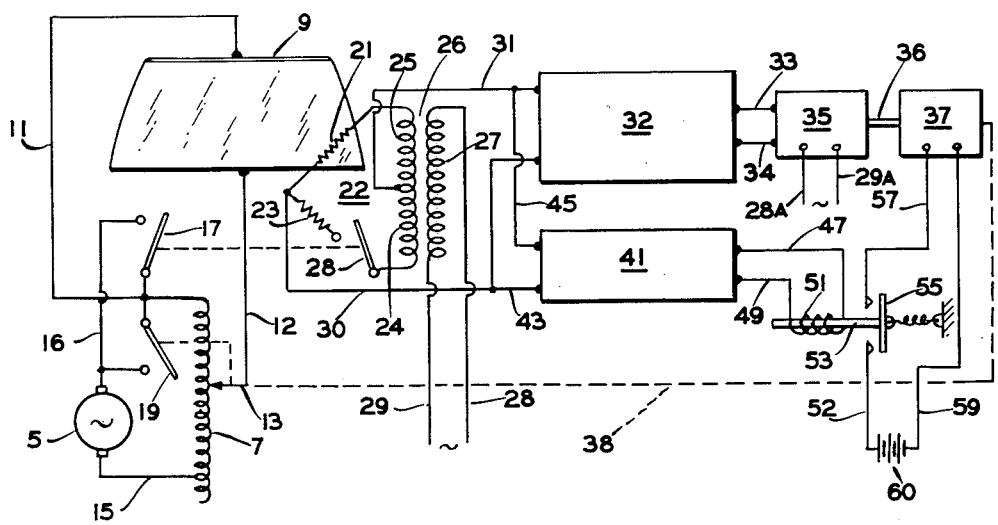
Figure 1 is a schematic diagram of a control system for a windshield heater.

Referring to the drawing of Figure 1, there is indicated by the numeral 5 an alternator of suitable type and which may be driven by an aircraft engine as a source of power, and a variable transformer 7 which is arranged to modify the output voltage applied by the alternator 5 to a windshield heater 9.

The heater 9 of the windshield may be a transparent electrical conductive coating applied to the windshield of a type such as sold under the trade-names Nesa and Electra-Pane. The heater 9 is connected by conductors 11 and 12 to the output of the transformer 7. The conductor 12 is connected to a movable arm 13 of the transformer 7. The transformer 7 is connected by conductors 15 and 16 to the output of the alternator 5. The conductor 16 is controlled by on-off switch 17 and limit switch 19 connected in parallel. Certain features of the heater control system disclosed herein have been claimed broadly in application Serial No. 68,594, filed December 31, 1948, by Joel D. Peterson.

2

A temperature sensing element 21 is embedded in the windshield and comprises a resistance having a high temperature coefficient, such as tungsten, and is used as a master to determine the amount and rate of application of heat to the windshield. The temperature element 21 may be of such a type as shown and claimed in copending application Serial No. 151,009, filed March 21, 1950, as a division of the application Serial No. 68,594, filed December 31, 1948, by Joel D. Peterson.

The temperature element 21 forms one arm of an alternating current excited bridge 22. A non-thermal sensitive reference resistor 23 serves as another leg of the bridge 22, and the remaining legs are provided by windings 24 and 25 forming the secondary of transformer 26. The bridge circuit is supplied with alternating current by primary winding 27 of the transformer 26 inductively coupled to the secondary windings 24 and 25. The winding 27 is connected to a suitable source of alternating current. The resistor 23 is of a value such as to balance the bridge when the control temperature, say for example, 120° F. is reached. The output of the bridge will be directional or phased, depending upon whether the resistance of the element 21 is above or below the reference resistor 23 which is connected into the bridges by an on-off switch 28 mechanically connected to switch 17. The output voltage of the bridge 22 is connected by conductors 30 and 31 to the input of a phase-sensitive detector and amplifier 32.

The output of the amplifier 32 is connected by conductors 33 and 34 to one phase winding of a reversible motor 35, which may be of the two-phase type; and the other phase winding being connected by conductors 28A and 29A across the source of alternating current for operation of the motor 35 in a manner well known in the art. The output shaft 36 of the motor 35 is mechanically connected to deliver torque to a gear train 37. The gear train 37 is of the two speed type having a ratio changing system and solenoid control clutch for selecting output speeds of rotation of N or N/10, the operation of which will be explained.

The output of the gear train 37 is mechanically connected by a shaft 38 to rotate the movable arm 13 of the variable transformer 7 to provide an output voltage dependent upon the position of the movable arm. The input voltage of the transformer 7 will be the output voltage of the alternator 5. Thus, when the value of resistor 21 is below that of the resistor 23, the bridge 22 will be unbalanced in a direction to energize the reversible motor 35 so as to drive the movable arm 13 of the transformer 7 in a direction to increase the voltage applied to the windshield 9. When the value of the resistor 21 is above that of the resistor 23, the bridge 22 will be unbalanced in the opposite direction to energize the motor 35 so as to drive the movable arm 13 of the transformer 7 in a direction to decrease the voltage applied to the windshield 9. Upon the values of the resistors 21 and 23 being equal the bridge will be balanced, hence the motor 35 will not be energized and as long as the temperature of the windshield remains constant, the voltage supplied thereto will be constant. As the temperature changes the control system will continouosuly adjust itself to maintain a constant preselected temperature at the windshield 9 regardless of changes in outside air temperature or heat transfer conditions.

In order to avoid thermal shock or other damage caused by a too rapid change in temperature, it is necessary to limit the rate of change to a safe value when the temperature of the windshield 9 is below a predetermined value, say for example 100° F. However, when the temperature of the windshield 9 reaches the predetermined temperature, a fast reaction to temperature changes due to changes in outside air temperature, aircraft speed, and heat transfer conditions is desirable. Such a method of applying heat to a transparent panel so as to effect the foregoing is disclosed and claimed in the copending divisional application Serial No. 274,484, filed March 1, 1952, by Harry R. Karp and Allen W. Blanchard.

By means of the two-speed gear train 37, two operating speeds are automatically obtained. The gear train 37 is mechanically connected to be operated through a solenoid controlled clutch as will be explained hereinafter with reference to Figures 2 and 3. Control for the solenoid is provided by an auxiliary circuit 41 connected by conductors 43 and 45 across the output of the bridge 22. The auxiliary circuit 41 may, for example, be an amplifier circuit so arranged as to have energy flowing in its output circuit when the temperature of the windshield 9 is below a predetermined value of, for example, 100° F. A pilot relay winding 51 is connected by conductors 47 and 49 across the output of the circuit 41. The relay winding 51 controls an armature element 53 arranged to close switch contacts 55 upon the winding 51 being energized. Closing the switch contacts 55 energizes the solenoid of the two-speed clutch 37 through conductors 57 and 59 from a source of D. C. electrical energy 60.

Upon energization, the solenoid actuates the clutch and thereby the gear train 37 to its N gear ratio where it will be maintained as long as the control solenoid is energized. When the gear train 37 is in this position, the movable arm 13 of the transformer 7 will be rotated slowly giving a slow rate of temperature rise.

Upon the temperature of the windshield 9 reaching 100° F., the auxiliary circuit 41 will cause relay winding 51 to release the armature 53 under spring tension and return the switch contacts 55 to an open position de-energizing the control solenoid of the gear train 37 and return the gear train 37 to its normal N/10 ratio. In this latter position the movable arm 13 will be rotated at a faster rate thus providing fast action to give good response in the region of the control temperature.

Figure 2:
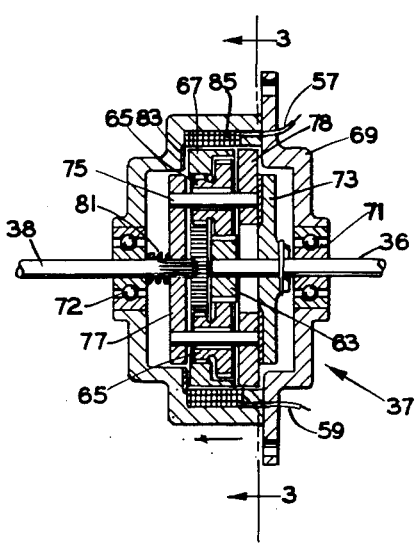
Figure 2 is a cross-sectional view of a solenoid operated clutch.
Figure 3:
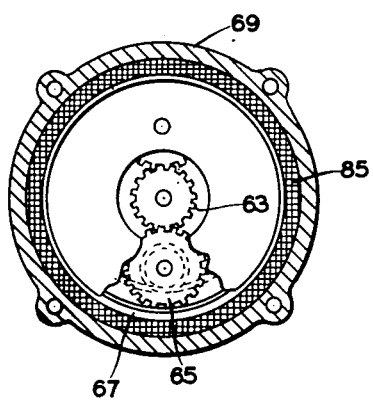
Figure 3 is a sectional view of the clutch of Figure 2 taken along the line 3—3 thereof.

The solenoid controlled clutch gear train 37 may be the clutch and gear train assembly illustrated by Figures 2 and 3 and disclosed and claimed in application Serial No. 99,765, filed June 17, 1949, by Harry R. Karp and Philip J. Guillot.

Secured to the input shaft 36 of the gear train 37 is a sun gear 63 which meshes with planet gears 65, which in turn mesh with orbit gear 67. The input shaft 36 is rotatably supported in housing 69 by bearing 71. Securely attached to the shaft 61 is a brake plate 73. The planet gears 65 are supported on shafts 75 carried by spiders 77 and 78. The spider 77 is splined to output shaft 38 which is rotatably supported in the housing 69 by a bearing 72. A compression spring 81 bears against the spider 77. Adjacent to the orbit gear 67 on the housing 69 is a brake facing 83. A solenoid winding 85 is arranged around the inner circumference of the housing 69. The winding 85 is connected through switch 55 to the source of direct current 60 by the conductors 57 and 59. The orbit gear 67 and spider 78 serve as the armature of the solenoid.

In operation, when the solenoid winding 85 is de-energized as shown in Figure 2, the spider 78 is held in intimate contact with the brake plate 73 by the pressure of the spring 81. This locks the planetary system and permits it to rotate with the shaft 36. When the solenoid winding 85 is energized, the pressure of the spring 81 is overcome and the spider 78 is moved out of contact with clutch plate 73 and the orbit gear 67 is biased by the solenoid 85 into intimate contact with the brake facing 83, whereupon the shaft 38 is driven through the planetary gear system.

When the pilot determines that heat will be needed at the windshield 9, he may manually actuate the switch 17 to the "on" position and close switch 28 in the bridge circuit 22 so as to place the bridge circuit 22 in an operative condition sensitive to temperature changes. The unbalance in the bridge circuit 23 causes the solenoid 85 to actuate the gear train 37 to the N ratio. The movable arm 13 of the variable transformer operated by shaft 38 begins to rotate slowly increasing the voltage applied to the windshield 9. As the movable arm 13 moves away from its low voltage position, the limit switch 19 operated by the arm 13 automatically returns to its normally closed position.

When the temperature of the windshield 9 reaches 100° F. the auxiliary circuit 41 opens the switch 55 and the solenoid 85 becomes de-energized. Spring means 81 actuate the gear train 37 to its N/10 ratio so that the arm 13 driven by shaft 38 rotates faster until the temperature is 120° F. As the temperature varies from 120° F., an unbalanced voltage appears at the output of the bridge 22 of such a phase as to cause the motor 35 to drive the arm 13 in such a direction as to increase (or decrease) the energy supplied and thus maintain 120° F. at the windshield 9.

To shut off the system, the switch 17 is actuated to its "off" position. This also opens the interconnected switch 28 in the bridge circuit 22 introducing a large unbalanced voltage in the system of such a phase as to cause motor 35 to drive the arm 13 to a low voltage position. This unbalanced voltage also causes the auxiliary circuit 41 to energize the solenoid 51 and close switch 55 to energize solenoid 85 which actuates the gear train 37 to its N ratio thereby rotating the arm 13 at a slow rate, thus limiting the rate of decrease of temperature.

Upon the arm 13 reaching its minimum voltage position, it will automatically operate the limit switch 19 to cut off all power to the system. The system will then be in the proper position when it is recycled.

The automatic temperature control system limits the rate of change of temperature to a safe value and also continuously adjusts itself to maintain a constant preselected temperature at the windshield regardless of changes in outside air temperature or heat transfer conditions. The only manual control required is the "on-off" switch 17—28, all other controls being automatic dependent upon conditions in the system.

Although only one embodiment of the invention has been illustrated and described, various changes in the form and relative arrangements of the parts may be made to suit requirements.

What is claimed is:

1. In a control system for regulating the temperature of a windshield having a heater element embodied therein, comprising a source of alternating current, a variable voltage device connected across said source for energization of said heater element, a bridge circuit having an input and an output, means for connecting said input to a source of alternating current, a resistor element having a high temperature coefficient of resistance connected in one leg of said bridge circuit and disposed to partake of the temperature of said windshield, said resistor element having a value so as to balance said bridge at a predetermined temperature, means including a first amplifier connected across the output of said bridge for operating said variable voltage device to alter the voltage delivered to said heater element in accordance with the direction of unbalance of said bridge, second means including a second amplifier and a two-speed gear train responsive to the output of said bridge for operating said voltage device at one speed when the temperature of said windshield is below a second predetermined temperature and at a different speed when the temperature of said windshield is above said second predetermined temperature.

2. In a control system for regulating the temperature of a windshield having a heater element associated therewith, comprising a source of alternating current, a variable voltage device connected across said source for energization of said heater element, an alternating current bridge circuit having an input and an output, a resistor element having a high temperature coefficient of resistance connected in one leg of said bridge circuit and disposed to partake of the temperature of said windshield, a resistance having a low temperature coefficient of resistance connected in another leg of said bridge circuit, said resistors having values to balance said bridge when said windshield is at a predetermined temperature, an amplifier connected across the output of said bridge for producing an alternating current of phase corresponding to the direction of unbalance, means including a two-speed gear train responsive to said alternating current for operating said variable voltage device in a direction determined by the phase of said alternating current.

3. The combination as described in claim 2 and including a second amplifier connected across the output of said bridge circuit for producing an alternating current of intensity corresponding to the amount of unbalance of said bridge circuit, means including a relay responsive to said alternating current intensity to actuate said gear train for one speed when said alternating current is above a predetermined intensity and for a different speed when said alternating current is below said predetermined intensity.

4. A control system for regulating the temperature of a transparent panel having a heater element embodied in the panel and a temperature sensitive element responsive to the temperature appurtenant to said panel; said control system comprising electric circuit means for supplying current to energize said heater element, motor means responsive to said temperature sensitive element, and a movable member for varying the current supplied said heater element through said circuit means, a variable speed power transmission to drivingly connect said motor means to said movable member at different speed ratios, control means for said power transmission to effect said different speed ratios, and means for operatively connecting said control means to said temperature sensitive element to selectively effect said different speed ratios in response to the prevailing temperature appurtenant to the panel.

5. A control system for regulating the temperature of a transparent panel having a heater element embodied in the panel and a temperature sensitive element responsive to the temperature appurtenant to said panel; said control system comprising, electric circuit means for supplying current to energize said heater element, motor means responsive to said temperature sensitive element, and a movable member for varying the current supplied said heater element through said circuit means, a variable speed power transmission to drivingly connect said motor means to said movable member at different speed ratios, control means for said power transmission to effect said different speed ratios, and means for operatively connecting said control means to said temperature sensitive element to selectively effect a high speed ratio upon the prevailing temperature appurtenant to said panel being in excess of a predetermined value and a low speed ratio upon the prevailing temperature appurtenant to said panel being less than a predetermined value.

6. A control system for regulating the temperature of a transparent panel having a heater element embodied in the panel and a temperature sensitive element responsive to the temperature appurtenant to said panel; said control system comprising electric circuit means for supplying current to energize said heater element, variable speed power means responsive to said temperature sensitive element, a movable member for varying the current supplied said heater element through said circuit means, means for operatively connecting said power means to said movable member, control means for said power means to effect different speed ratios in response to said temperature sensitive element, and means for operatively connecting said control means to said temperature sensitive element to selectively effect a high speed ratio upon the prevailing temperature appurtenant to said panel being in excess of a predetermined value and a low speed ratio upon the prevailing temperature appurtenant to said panel being less than a predetermined value.

HARRY R. KARP.
ALLEN W. BLANCHARD.

(References on following page)

REFERENCES CITED

The following references are of record in the file of this patent:

UNITED STATES PATENTS

| Number | Name | Date |
|---|---|---|
| 1,320,071 | Lehr | Oct. 28, 1919 |
| 1,675,392 | Tompkins | July 3, 1928 |
| 1,694,264 | Hull | Dec. 4, 1928 |
| 1,715,750 | Gano | June 4, 1929 |
| 1,942,587 | Whitman | Jan. 9, 1934 |
| 2,079,497 | Wilhjelm | May 4, 1937 |
| 2,462,207 | Mershon | Feb. 22, 1949 |
| 2,470,633 | Mershon | May 17, 1949 |

FOREIGN PATENTS

| Number | Country | Date |
|---|---|---|
| 399,582 | Germany | July 23, 1924 |
| 544,407 | France | June 21, 1922 |
| 590,050 | France | Mar. 8, 1925 |
| 819,170 | France | July 5, 1937 |